United States Patent [19] [11] 4,128,934
Doring [45] Dec. 12, 1978

[54] METHOD OF MAKING A THERMALLY INSULATED WINDOW FRAME

[75] Inventor: Gerhard Doring, Wuppertal-Ronsdorf, Germany

[73] Assignee: Firma Julius & August Erbsloh, Wuppertal-Barmen, Germany

[21] Appl. No.: 576,135

[22] Filed: May 9, 1975

Related U.S. Application Data

[62] Division of Ser. No. 393,581, Aug. 31, 1973, abandoned, which is a division of Ser. No. 159,629, Jul. 6, 1971, abandoned.

[30] Foreign Application Priority Data

Jul. 6, 1970 [DE] Fed. Rep. of Germany ...... 20 33442

[51] Int. Cl.2 ........................ B29D 27/04; B23P 11/00

[52] U.S. Cl. ................................ 29/460; 49/DIG. 1; 52/309.8; 52/730; 264/46.5; 264/46.6; 264/46.7; 264/138; 264/267; 428/34

[58] Field of Search .................... 264/46.6, 46.5, 46.7, 264/138, 267; 52/309, 309.3, 703; 29/460; 428/34

[56] References Cited

U.S. PATENT DOCUMENTS

| | | | |
|---|---|---|---|
| 2,782,887 | 2/1957 | Zimmermann | 264/46.6 X |
| 3,156,332 | 11/1964 | Cameron | 52/403 |
| 3,159,886 | 12/1964 | Lynch | 264/46.6 X |
| 3,204,324 | 9/1965 | Nilsen | 52/309.3 X |
| 3,251,912 | 5/1966 | Fish | 264/46.6 X |
| 3,411,254 | 11/1968 | Kessler | 52/309 |
| 3,445,974 | 5/1969 | Bragman | 49/DIG. 1 |
| 3,512,318 | 5/1970 | Turner | 52/204 X |
| 3,786,121 | 1/1974 | Schaerer | 49/DIG. 1 |
| 3,815,216 | 6/1974 | Brockway et al. | 29/460 |
| 3,823,524 | 7/1974 | Weinstein | 52/403 X |
| 3,832,818 | 9/1974 | Nahr | 49/DIG. 1 |
| 3,872,198 | 3/1975 | Britton | 264/46.6 |
| 3,919,371 | 11/1975 | Jache | 264/DIG. 83 |

FOREIGN PATENT DOCUMENTS

| | | | |
|---|---|---|---|
| 1245567 | 7/1967 | Fed. Rep. of Germany | 264/46.6 |
| 119554 | 6/1970 | Norway | 264/46.6 |
| 444444 | 2/1968 | Switzerland | 264/46.6 |

*Primary Examiner*—Philip Anderson
*Attorney, Agent, or Firm*—Karl F. Ross

[57] ABSTRACT

To provide a frame with members having two outer elements which are interconnected by an insulator, each member is formed from a hollow bar in which the insulator is molded and then two longitudinal strips are removed from the bar, the two remaining parts of the bar forming the outer elements of the frame member. The bar is provided with longitudinal weakening grooves to facilitate removal of the strips, or the strips constitute mold members which clamp the outer elements and, together with the outer elements, define the hollow cavity within the bar.

1 Claim, 6 Drawing Figures

METHOD OF MAKING A THERMALLY INSULATED WINDOW FRAME

This is a division of Ser. No. 393,581, filed Aug. 31, 1973 which in turn is a division of Ser. No. 159,629, filed July 6, 1971 and both now abandoned.

FIELD OF THE INVENTION

The invention relates to a method for the manufacture of a compound-section structural means for the formation of an assembly in which two outer portions are interconnected by an insulator.

BACKGROUND OF THE INVENTION

Compound section structural means with connecting insulators are suitable for the manufacture of frames in which outer portions, for example composed of a light metal, are interconnected by means of an insulator of foamed or expanded synthetic resin material.

Frames of this kind are suitable for windows, doors, facade sections and the like, in which it is vital to prevent or to impede heat flow, resulting from temperature differentials, through the frame.

It is known to press bars made of a synthetic resin with snap action into prepared cavities provided in the surfaces of the metal sections to be interconnected and thus to insert a third member of a suitable strength and adequate holding properties between the parts to be interconnected. In this method however, it is difficult to obtain predetermined tolerances, since it is practically impossible to bring about an interconnection of the frames which is free from play.

It is also known that attempts have been made to remove these difficulties by manufacturing the two outer portions of the frame initially as a solid unit and to form a cavity between these two portions. This cavity is then filled with a liquid synthetic resin. When the synthetic resin has hardened, the wall of the cavity is cut through by mechanical means and the direct metallic connection between the two frame halves is thus removed. While predetermined tolerances are maintained by this measure, since a firm interconnection of the sections can be obtained by the poured-in synthetic resin which subsequently hardens, it is difficult for the unwanted cavity walls to be removed simply and cheaply, since it has been found in practice that the skin on the surface of the synthetic resin body is damaged by mechanical cutting operations and its strength is thus reduced. Moreover, damage to the surface of the insulator involves the danger of a premature ageing resulting from detrimental influences of moisture, vapors and the like.

OBJECT OF THE INVENTION

It is thus an object of the invention to provide a method for the manufacture of a compound-section structural means which avoids the disadvantages of the known methods of producing assemblies suitable for frames of the kind referred to hereinbefore, in which the parts are free from play regardless of minor accuracies, and which enables the assembly to be produced without the risk of damage to the insulator.

SUMMARY OF THE INVENTION

According to the invention there is provided a method for the manufacture of compound-section structural means for the formation of an assembly in which two outer portions are interconnected by an insulator, the structural means comprising an elongated bar formed with a longitudinally extending hollow cavity which is bounded on four sides by the two outer portions and by two oppositely disposed panels connecting the two outer portions, the panels being detachable from the outer portions without cutting after provision of the insulator within the cavity.

The invention also provides a method for the manufacture of a frame member comprising an assembly formed from compound section structural means as described above, in which the insulator is formed from foamed or expanded synthetic resin material.

The invention further provides a method of forming an assembly in which two outer portions are interconnected by an insulator, comprising the steps or molding the insulator in the cavity of compound section structural means as described above, and subsequently tearing or scraping away the detachable panels.

The invention affords the following advantages:- the resistance of the assembly produced from such compound section structural means to deformation and the required stability of such as assembly are not reduced by the foaming pressure of the nascent insulator, and the panels interconnecting the outer portions may be removed without having to carry out any cutting operation. When molded, the insulator is thus not exposed to any danger of being damaged upon removal of the panels.

In one embodiment of the invention, the two outer portions and the two panels are integrally connected, each panel being formed with external weakening notches at the junctions between the panel and the outer portions.

Each notch may extend continuously along the junction between a panel and an outer portion, and is bounded by a bevelled edge of the panel and an edge of the outer member which is flush with the inner surface of the panel.

Wall-weakening notches provided in compound section frames are known. However, the grooves or notches are provided on the inside of webs bounding a cavity, enclosing an insulator, and permit the formation of bulge-like or convex beads on the insulator. When such a web is sawn straight through along the groove, the danger of notches forming in the insulator causing it to break is reduced.

In another embodiment of the invention, the two outer portions are provided with retaining means adjacent at least one of the detachable panels for the insertion of insulating means, for example of synthetic resin material, to bridge the space, at least along part of the length of the assembly, between the two outer members, and to stiffen the assembly. The retaining means may consist of guide grooves.

Such a construction is advantageous where the assembly formed from the compound-section structural means forms part of a frame for carrying a pane of glass; when a pressure is applied to the insulator as a glass-retaining strip is clipped to and clamped in position on one outer portion, stresses occur. The retaining means make it possible to increase the rigidity of the frame in general and to make it immune to considerable unilateral mechanical loads.

Where two frame members respectively form adjacent parts of two co-operating frames, for example: where one frame carries a pane of glass and the other frame carries a blind, one outer portion of one of the frame members may be provided with retaining means adjacent at least one of its detachable panels, and sealing means engageable with the other frame member may be mounted in the retaining means.

DESCRIPTION OF THE DRAWING

Frame members embodying the invention are hereinafter described, by way of example, with reference to the accompanying drawing, in which.

SPECIFIC DESCRIPTION

Figure 1:
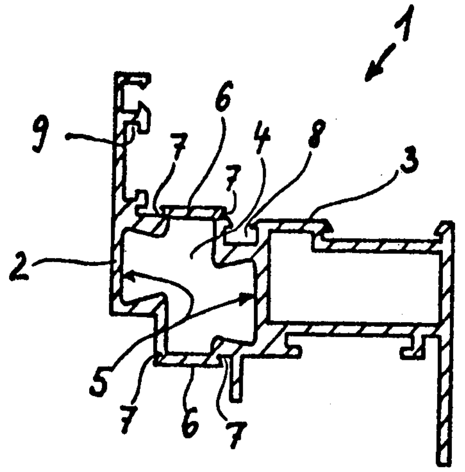
FIG. 1 is a cross-section through a hollow-section frame member with detachable panels weakened by notches.
Figure 2:
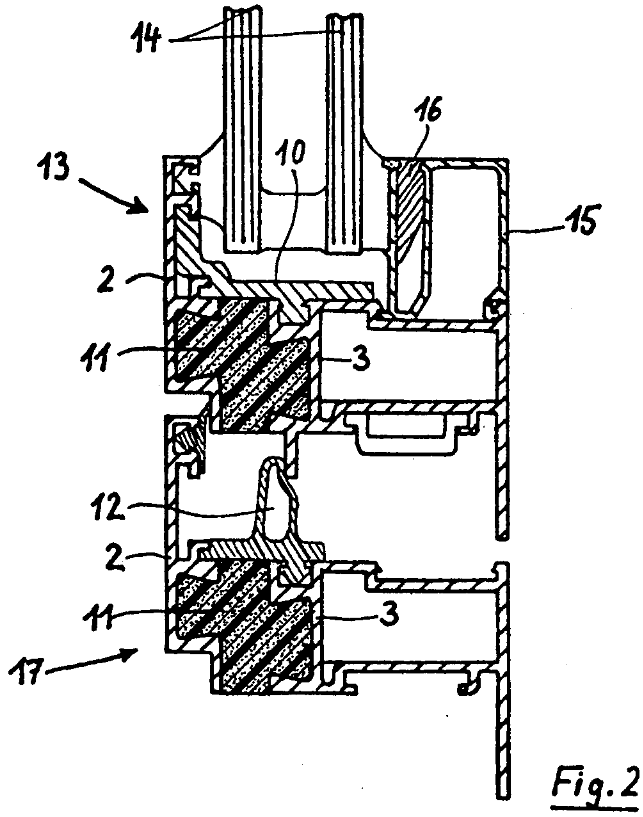
FIG. 2 is a cross section through two of the sections shown in FIG. 1, in the mounted position and after removal of the detachable panels.

As shown in FIGS. 1 and 2 compound-section frame member or profile 1, which may be produced as a solid unit, for example in the form of an extruded aluminum alloy section, comprises two outer portions 2,3 which are interconnected by removable panels 6 or strips unitary therewith. The removable (opposite) panels 6 laterally close a space 4 between the outer portions 2,3, guide grooves 5 (of dovetail cross section) being provided adjacent the space 4 for subsequently anchoring an insulator 11 (FIG. 2). Continuous, wall-weakening notches 7 cut preferably laterally into the wall are provided in the edge portions of the removable panels 6. Clearly, the walls 6 may be pulled (torn) off with relatively little effort in the upward and downward directions. It will be understood that the notches may also be provided at other positions.

Before these operations are carried out, a synthetic resin in liquid form is poured into the space or gap 4. This synthetic resin hardens to form an insulator 11 which is a solid block or a mass of solidified foam. When the panels 6 are removed in the manner hereinbefore described, the two outer portions 2, 3 are held together by the insulator 11 thus formed. In the removal of the panels 6 it is of vital importance that the surface of the insulator should remain undamaged.

Guide grooves 8,9 are provided on both sides of each panel 6 in the two outer portions 2,3 for receiving a retaining section 10 and a sealing section 12, respectively (FIG. 2).

The disposition of the outer portions 2,3 after the removal of the panels 6 is shown in FIG. 2. It will be noted that only the insulator 11 remains between the outer portions 2,3, the insulator preventing a heat flow from one side of the frame member to the other.

The rigidity of frame members of this kind would, however, be insufficient, particularly where, as is the case in the construction illustrated in FIG. 2, a glass-retaining strip 15 is connected to the outer portion 2, into which glass-retaining strip wedge 16 is pressed in order to maintain the necessary contact pressure on a pane of glass 14. Wedge 16 would produce tensile forces in the insulator 11, but these are accommodated by the aforementioned retaining section 10 made of an insulating material. The retaining section 10 need only be provided at intervals. Where the retaining section 10 is provided in the form of a strip, it simultaneously seals the insulator 11 from the window pane 14 thus preventing the action of the atmosphere upon the insulator 11.

The guide groove 8 provided in the outer portions 2,3 for the insertion of the retaining section 10 may serve alternatively as the means by which a sealing section 12 is held in position when one of the window members 13 forms part of a window frame and the other frame member 17 forms part of a blind as in the construction illustrated in FIG. 2. It will be understood that the disposition of the retaining section 10 is independent of the method by which the insulator 11 is produced.

Figure 3:
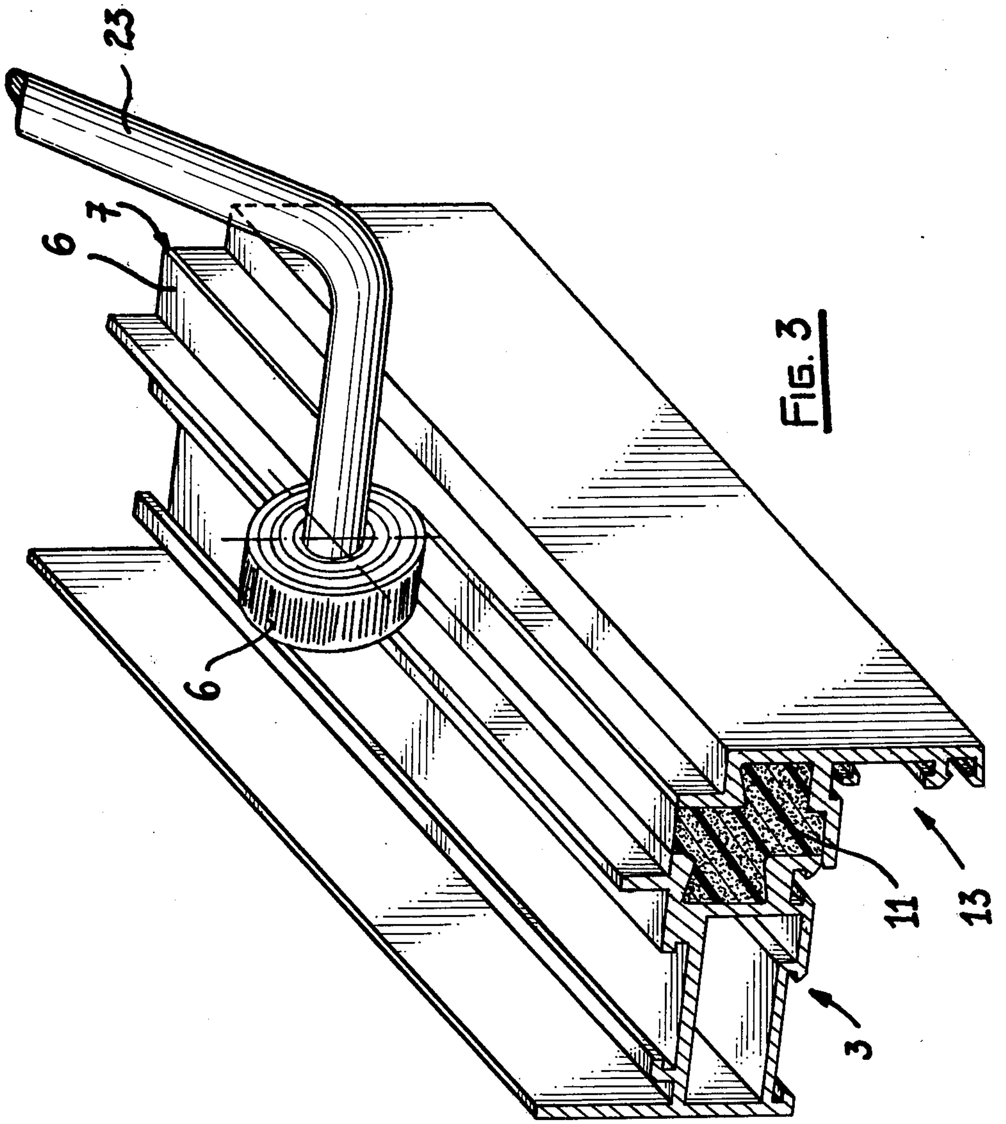
FIGS. 3 and 4 are perspective views illustrating means used for removing the detachable panels.
Figure 4:
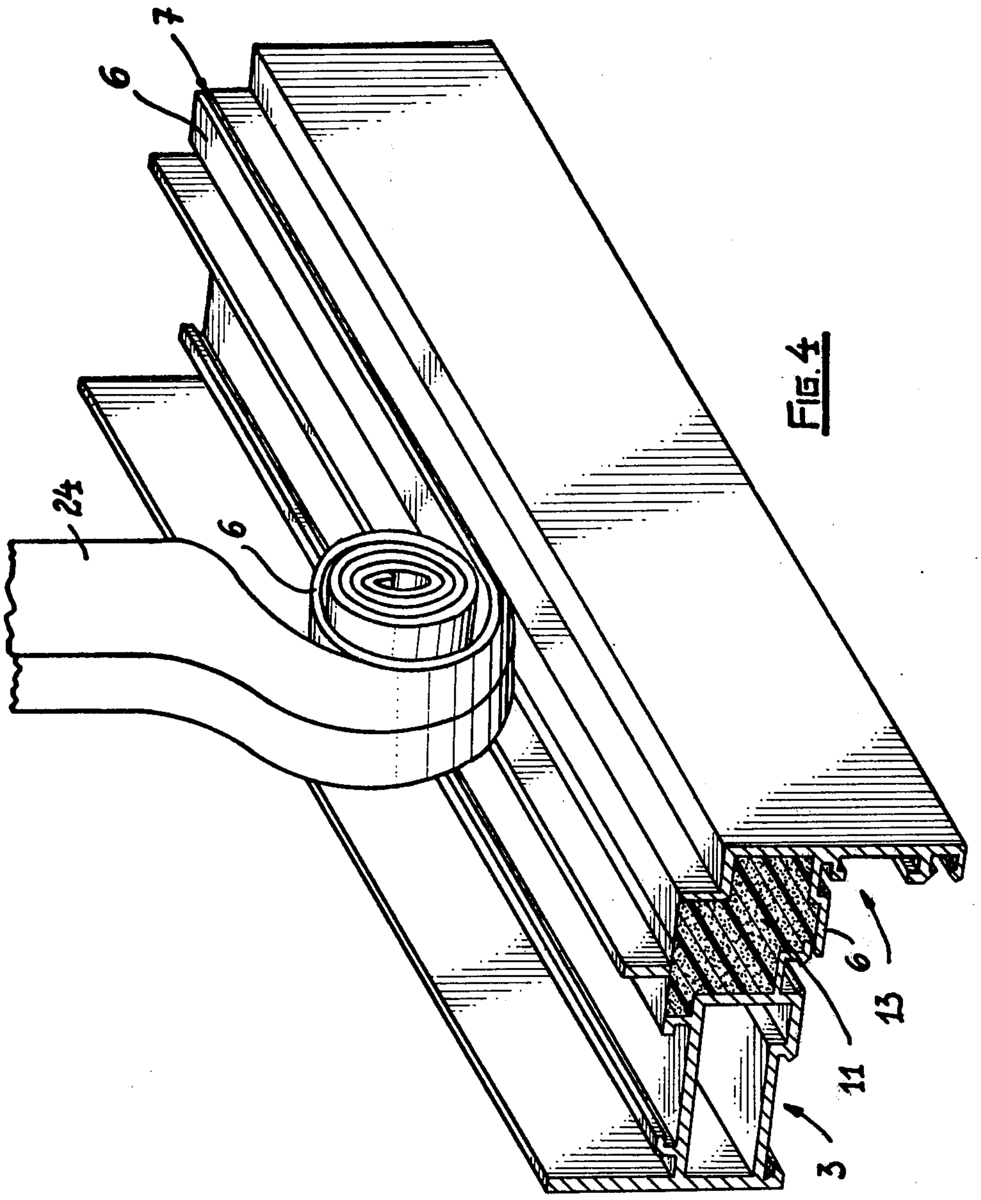

FIGS. 3 and 4 show the means by which the wall 6 can be removed very quickly without endangering the insulator 11, since cutting operations are dispensed with. As illustrated in FIG. 3, the panel 6 is rolled up by means of a turning handle 23 or the like similar to the band closures provided in cans. As illustrated in FIG. 4, the panel is peeled off by means of a peeling tool 24, on relative longitudinal axial movement between the peeling tool 24 and the sections 2,3 similar to the relative movement in planing machines. When the peeling tool 24 is of a concave tapered construction, the peeled-off panel is deformed into a spiral roll.

Figure 5:
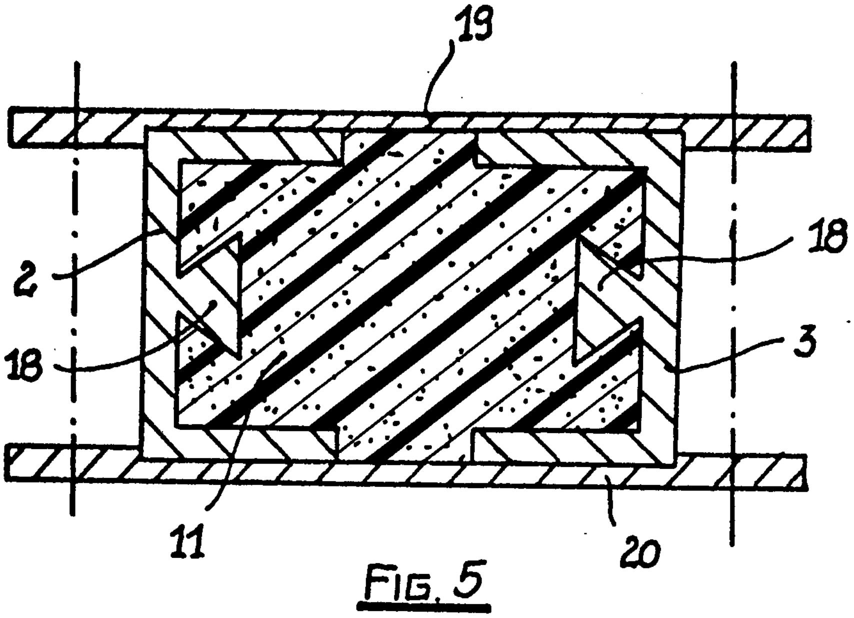
FIGS. 5 and 6 are cross-sections through frame members and two enclosing mould members.
Figure 6:
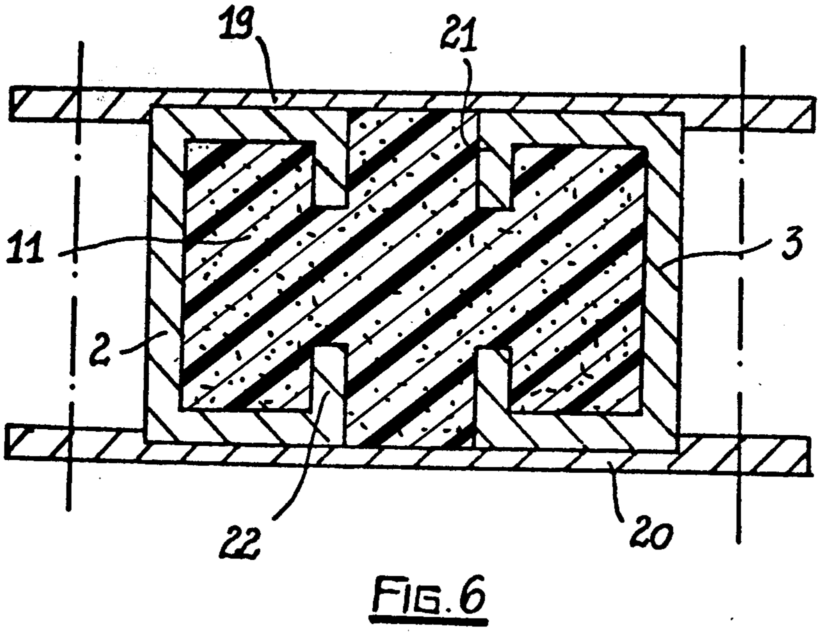

In the embodiments illustrated in FIGS. 5 and 6, the frame member comprises the substantially channel-section outer portions 2 and 3 provided with a dovetail section projection 18 at the base. The cuter members are clamped in position in mold members 19,20 by which the distance between the sections is fixed, the mold members 19,20 and the outer portions 2,3 forming a hollow chamber into which a foamable synthetic resin 11, preferably of the polyurethane or polyester group, is poured. The foaming pressure, which may amount to up to 5 atmospheres gauge, is then taken up by the mold members 19,20. When the mold members are removed the two outer portions are securely and undetachably interconnected, since the projections 18 are clamped firmly in position in the synthetic resin.

Where the construction according to the invention is used, an aggregate or additive may be added to the synthetic resin whereby the coefficient of linear expansion of the synthetic resin may be approximated or adjusted to that of the metal.

The volumetric weight or density of the synthetic resin insulator may be varied according to the foaming pressure by suitable selection and composition of the synthetic resin, thus permitting control of the ultimate strengths within a relatively large range, since the compressive and bending strengths are directly dependent upon the volumetric weight or density which, in turn, is determined by the foaming pressure.

FIG. 6 shows a modification of the construction illustrated in FIG. 5, in which the projection provided at the base of the outer portions 2 and 3 is replaced by bent portions 21,22 each provided at the ends of the arms of the channel-section outer portions.

I claim:

1. A method of making a thermally insulated window frame, comprising the steps of:

forming a frame structure from unitarily hollow extruded metallic members with completely closed internal profiles consisting of oppositely directed dovetail channels on opposite sides of each member, said sides of each member being bridged by two opposite metallic strips unitarily attached to said sides and defining separating grooves therewith;

filling by pouring into the interiors of said members of the respective channels a liquid hardenable foamable thermally insulating material;

foaming said insulating material in the interior of said members against said sides and said strips with pressure;

hardening the insulating material in the interior of each member and the respective channels;

tearing both said strips away from each member to separate the sides thereof from one another and expose respective faces of the hardened material flush with edges of said member, each strip being torn away by rolling it up and thereby peeling it away; and fitting a sealing strip over one of said faces into said sides along the length of the respective member.

* * * * *